No. 743,961. PATENTED NOV. 10, 1903.
W. A. WALKER.
STOP MECHANISM.
APPLICATION FILED AUG. 5, 1903.
NO MODEL. 2 SHEETS—SHEET 1.
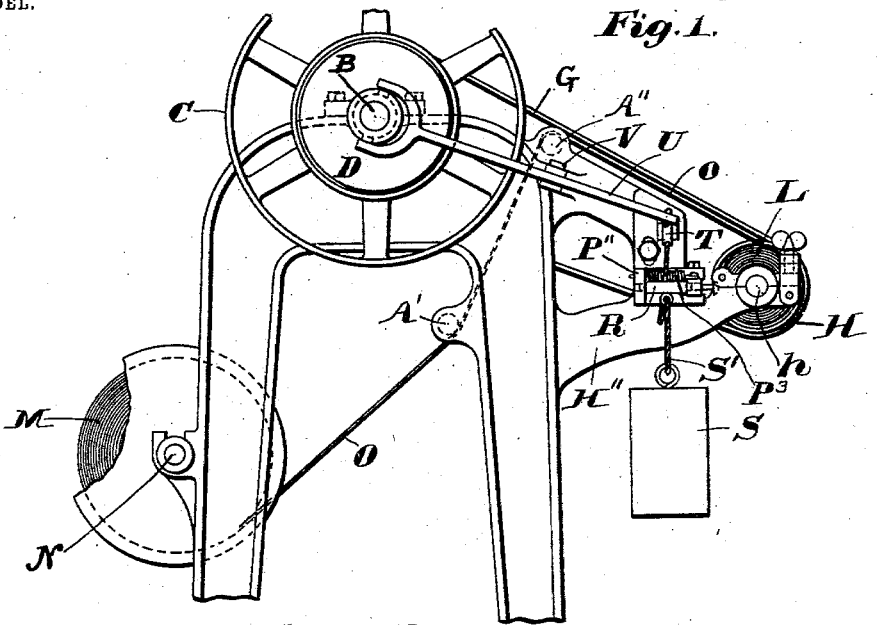
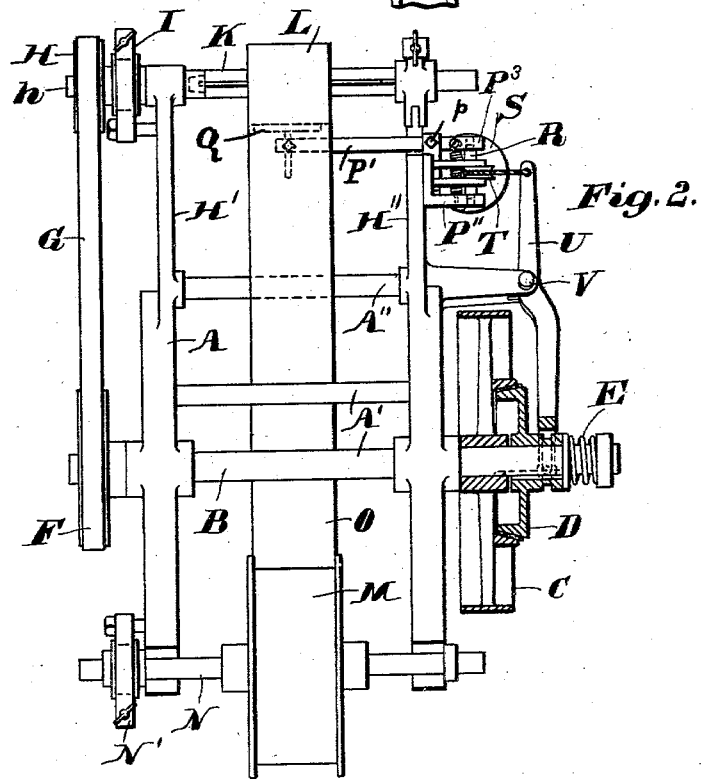
Witnesses
Edwin F. Luce
Edw. C. Cleveland
Inventor:
William A. Walker,
by Nathan Andrew
Atty.

No. 743,961. PATENTED NOV. 10, 1903.
W. A. WALKER.
STOP MECHANISM.
APPLICATION FILED AUG. 5, 1903.
NO MODEL. 2 SHEETS—SHEET 2.
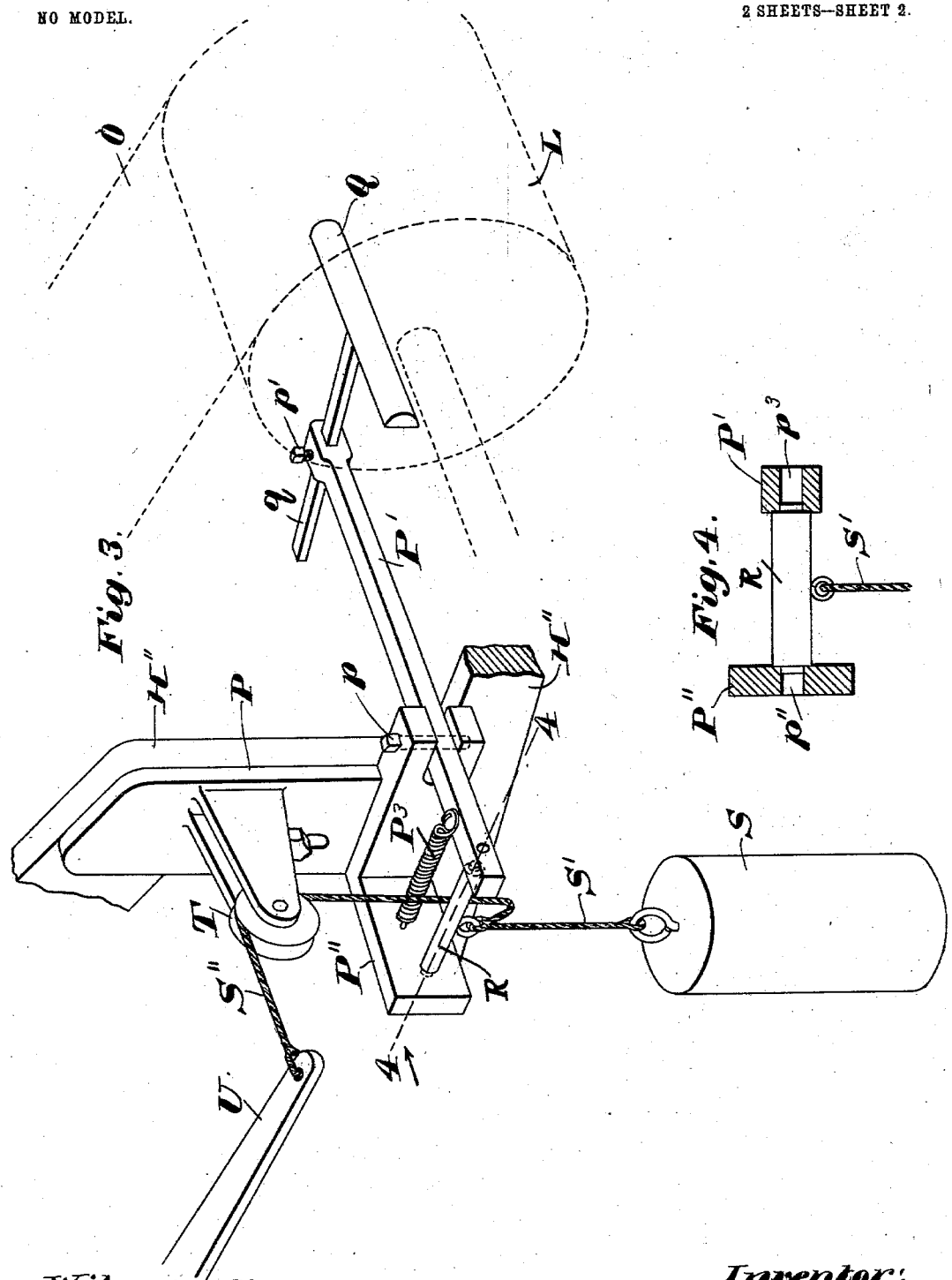
Witnesses:
Edwin T Luce
Edw C Cleveland
Inventor:
William A Walker
by Ivan Andrén
Atty.

No. 743,961. Patented November 10, 1903.

UNITED STATES PATENT OFFICE.

WILLIAM A. WALKER, OF BEVERLY, MASSACHUSETTS, ASSIGNOR OF ONE-HALF TO DANIEL A. KILHAM, OF BEVERLY, MASSACHUSETTS.

STOP MECHANISM.

SPECIFICATION forming part of Letters Patent No. 743,961, dated November 10, 1903.

Application filed August 5, 1903. Serial No. 168,308. (No model.)

*To all whom it may concern:*

Be it known that I, WILLIAM A. WALKER, a citizen of the United States, and a resident of Beverly, in the county of Essex and State of Massachusetts, have invented certain new and useful Improvements in Stop Mechanism, of which the following is a specification.

This invention relates to certain new and useful improvements in stop mechanism, and is applicable to any kinds of sheet-winding devices for paper, cloth, or other textile or fibrous materials, as well as to paper slitting and rewinding machines of the kind shown and described in the patent granted to Inman and Jacques December 22, 1891, No. 465,575, or other similar slitting and rewinding machines.

In winding-machines it is frequently required to stop the machine as soon as the roll reaches its desired diameter, which usually requires the constant attendance and inspection of an operator. To obviate such labor, I provide the winding-machine with an automatic stop device actuated by the size of the roll on the winding-shaft, by which the machine will be automatically stopped and the winding operation ceased as soon as the roll reaches the desired diameter.

My invention is carried out as follows, reference being had to the accompanying drawings, wherein—

Figure 1 is an end elevation of a winding-machine provided with my improved automatic stopping device. Fig. 2 is a plan view of Fig. 1, partly shown in section. Fig. 3 is a detail perspective view of the automatic stopping device, and Fig. 4 is an enlarged cross-section on the line 4 4 shown in Fig. 3.

A A are the standards or frames of a winding-machine, secured at a proper distance apart, as is usual in winding, rewinding, or slitting machines. In suitable bearings in said frames is journaled the rotary driving-shaft B, which is set in a rotary motion in any suitable or well-known manner. In the drawings, Figs. 1 and 2, I have shown a loose pulley C journaled on one end of said shaft B and adapted to be rotated by belt-power, as usual. In connection with such loose pulley C, I have shown a friction-clutch D longitudinally movable and splined on the shaft B and normally held in engagement with said pulley C by means of a spring E. (Shown in Fig. 2.) Such device is only shown as an illustration, and I wish to state that any well-known mechanism may be used for intermittently imparting a rotary motion to the shaft B from the pulley C without departing from the essence of my invention.

On the driving-shaft B is secured a pulley F, from which leads a belt G to a pulley H, preferably running loose on a shaft $h$ and connected to a friction device I on the said shaft $h$, similar to that shown in the above-mentioned patent, No. 465,575, to Inman and Jacques. The shaft $h$ is journaled in a bracket H', secured to the frame A, and to it is detachably connected one end of the roll-shaft K, on which the paper-roll L is wound. The other end of said roll-shaft K is detachably journaled in a similar bracket H'', secured to the opposite frame A in a manner similar to that shown in said Patent No. 465,575.

In the drawings, Figs. 1 and 2, I have shown a paper-roll M on the shaft N, loosely journaled in bearings in the frames A A and preferably provided with a suitable friction device N' of any well-known construction.

O is the strip which is being wound from the roll M to the winder-roll L on the shaft K during the winding operation, as usual.

A' and A'' are suitable guide-rollers for guiding the strip O from the roll M to the roll L, as shown in Figs. 1 and 2.

The above is a description of an ordinary winding-machine, and I desire to state that I do not claim such a construction as my invention, and it is only shown and described for illustration of my automatic stopping device to be used in connection with a winding-machine or a paper slitting and rewinding machine, shown and described in the patent hereinabove mentioned, or similar machines.

My automatic stopping device is constructed, preferably, as follows:

To the bracket H'' or other part of the machine is secured a plate P, to which is pivotally connected at $p$ a lever P', to the inner end of which is adjustably secured, preferably by means of a binder-screw $p'$, a roll-guide preferably composed of a rod $q$, terminating in its outer end as a cross-bar or projection Q, adapted to contact with the roll L when the latter is wound to the limit of its desired diameter.

P″ in Fig. 3 is a side projection on the plate P, and said projection is preferably provided with a notch or perforation $p''$. (Shown in detail in Fig. 4.) A similar notch or perforation $p^3$ is made in the end of the lever P′ opposite to the notch or perforation $p''$ in the stationary projection P″. In said notches or perforations is normally located the reduced ends of a releasing-pin R, which is normally held interlocked relative to the stationary part P″ and pivoted lever P′ by the influence of the yielding spring $P^3$. (Shown in Fig. 3.) In connection with such pivoted lever P′ and its roll-guide Q, I use a suitable intermediate connecting mechanism to the clutch D, so as to cause the latter to be automatically disconnected from the pulley C as soon as the roll L during the winding operation reaches the desired diametrical size by contacting with the yielding guide Q on the pivoted lever P′ and consequent release of the pin R.

Any suitable intermediate connecting mechanism and any suitable clutch on the driving-shaft may be used in connection with the automatic stopping device without departing from the essence of my invention; but for purposes of illustration I have shown in the drawings a weight S, suspended from the releasing-pin R by means of a cord S′. To said cord or to the pin R is loosely attached a cord S″, preferably guided on a pulley T, the end of which is connected to a lever U, pivoted at V and having its other end suitably connected to the grooved hub of the clutch D, as is usual in clutch-operating mechanism.

The operation is as follows: During the winding operation of the strip on the roll L the pin R is held by the spring $P^3$ interlocked with the stationary projection P″ and lever P′, as shown in the drawings. When the diameter of the roll L reaches the size desired, it causes the inner end of the lever P′ and its guide Q to be pushed backward by the roll L sufficient to cause the pin R to be disengaged from its supports and causing the now-released weight S to pull on the cord S″, by which the clutch D is disengaged from the loose driving-pulley C, by its connection with the pivoted lever U, thereby causing the machine to be automatically stopped.

This automatic stopping device may to advantage be used, if so desired, on slitting and rewinding machines of the kind shown in the above-mentioned patent or other similar devices in which a slitting mechanism is used and a series of shafts upon which the slitted strips are wound.

By adjusting the position of the guide Q relative to the yielding lever P′ the device can be adjusted and set so as to automatically stop the machine according to any size of roll desired.

Having thus fully described the nature, construction, and operation of my invention, I wish to secure by Letters Patent and claim—

1. In combination with a winding-machine, an automatic stopping device, consisting of a yielding lever, an adjustable roll-guide carried on one end thereof, means engaging in the other end of the lever for normally holding said lever and guide yieldingly in position during the running of the machine, a releasing device and intermediate connecting mechanism to the driving-shaft for automatically stopping the machine by the said guide contacting the roll when wound to the desired size as herein set forth.

2. In combination with a winding-machine, the herein-described automatic stopping device, consisting of a yielding guide, a locking device for holding the latter normally in position, a weight connected to said device, and intermediate connecting mechanism from said weight to the clutch device on the driving-shaft, as and for the purpose set forth.

3. The herein-described automatic stopping device, for winding-machines, consisting in combination, a roll, a pivoted spring-pressed lever, a guide adjustably secured to said lever, a releasing device, a weight normally suspended from the latter, and intermediate connecting mechanism between such weight, and the clutch-operating device, on the driving-pulley, substantially as and for the purpose set forth.

4. In a paper-winding machine, a rotary shaft, upon which the material is to be wound, in combination with an automatic stop device, adapted to automatically stop the machine upon completion of the desired winding operation, said stop device consisting of a yielding adjustable guide, adapted to contact the roll when wound to the required size, means for normally holding said guide in position, a guide-releasing device, a weight attached to the latter, and intermediate connecting mechanism between said releasing device, and the clutch-operating device, substantially as specified.

In testimony whereof I have affixed my signature in presence of two witnesses.

WILLIAM A. WALKER.

Witnesses:
ALBAN ANDRÉN,
KARL A. ANDRÉN.